United States Patent [19]
Takano

[11] Patent Number: 5,706,118
[45] Date of Patent: Jan. 6, 1998

[54] OPTICAL TRANSMISSION METHOD AND OPTICAL TRANSMISSION APPARATUS

[75] Inventor: Isamu Takano, Tokyo, Japan

[73] Assignee: NEC Corporation, Tokyo, Japan

[21] Appl. No.: 627,344

[22] Filed: Apr. 1, 1996

[30] Foreign Application Priority Data

Mar. 31, 1995 [JP] Japan .................................. 7-75579

[51] Int. Cl.$^6$ .................................................. H04B 10/06
[52] U.S. Cl. ...................... 359/189; 359/161; 250/214 A
[58] Field of Search ................................. 359/180, 181, 359/184–186, 158, 161, 187, 189, 194; 372/38; 375/340; 250/214 A, 214 R

[56] References Cited

U.S. PATENT DOCUMENTS 5,325,225   6/1994   Suzaki et al. ............................ 359/180
5,548,435   8/1996   Tahara et al. ............................ 359/180

*Primary Examiner*—Kinfe-Michael Negash
*Attorney, Agent, or Firm*—Sughrue, Mion, Zinn, Macpeak & Seas, PLLC

[57] ABSTRACT

The invention provides a very high speed optical transmission apparatus which is tough against a variation in mark rate using an equalizing amplification circuit of a narrow-band frequency characteristic. The optical transmission apparatus includes an equalizing amplification circuit including a photoelectric conversion circuit for receiving a non-return-to-zero code as a reception signal, a peak value detection circuit, a dc amplifier, a timing extraction circuit, a dc regeneration circuit and an identification circuit. The equalizing amplification circuit includes a differentiating circuit for producing a differentiation equalization waveform of a reception signal of a non-return-to-zero code. The dc regeneration circuit includes a logic circuit for outputting logically positive and negative signals of an output signal of the equalizing amplification circuit, and a set-reset flip-flop circuit for receiving the logically positive signal of the output of the logic circuit as a set signal and receiving the logically negative signal of the output of the logic circuit as a reset signal. A full-wave rectification circuit is provided at an input terminal of the timing extraction circuit.

2 Claims, 4 Drawing Sheets

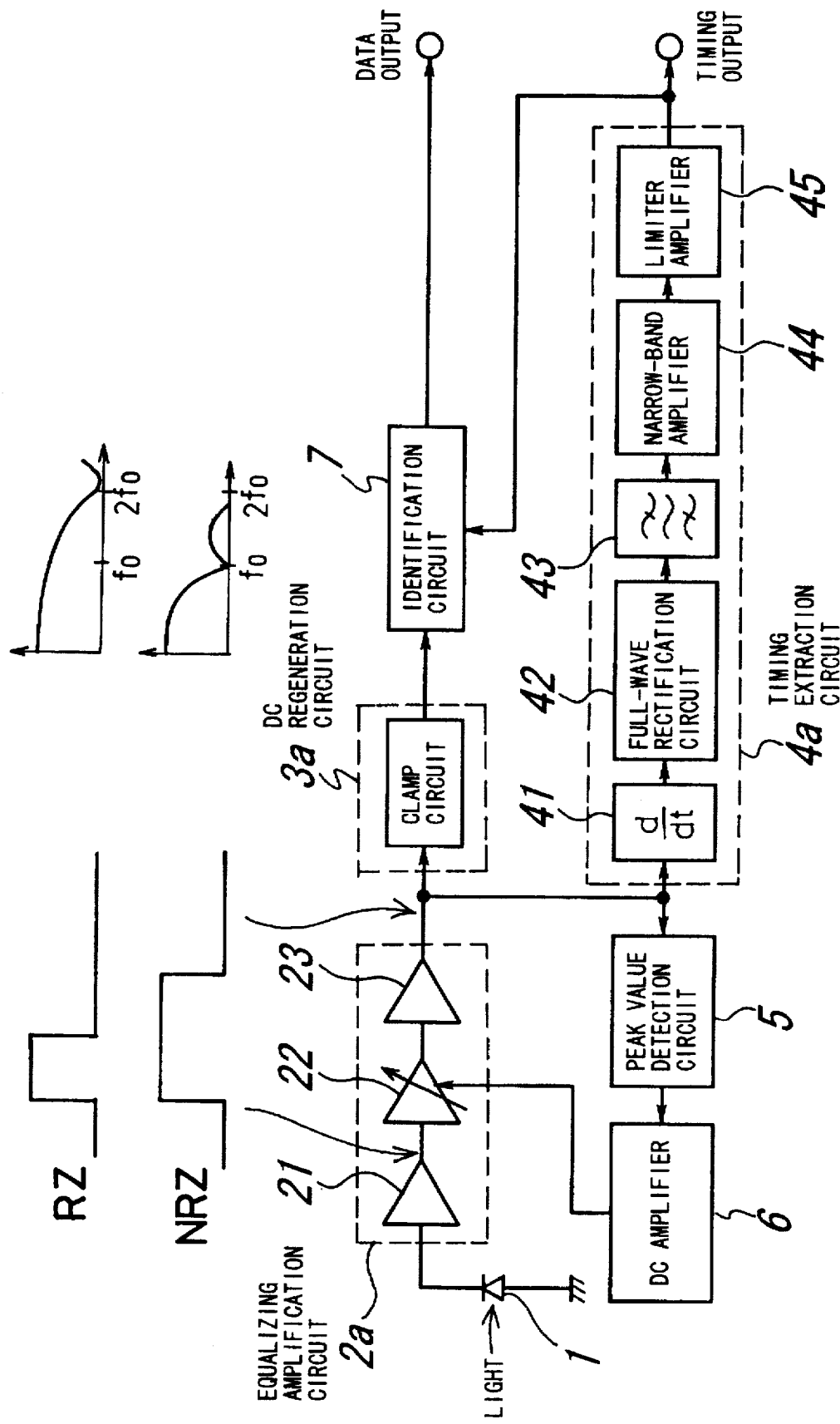

OPTICAL TRANSMISSION METHOD AND OPTICAL TRANSMISSION APPARATUS

BACKGROUND OF THE INVENTION

1. Field of the Invention

This invention relates to an optical transmission method and an optical transmission apparatus.

2. Description of the Related Art

As the optical transmission technology proceeds, research regarding very high speed optical transmission technology which employs an optical device/single mode fiber of a long wavelength band is being conducted in order to realize large capacity, long haul transmission systems. Particularly, in order to realize a wide band information communication network by which various services of pictures, data and sound are provided, an optical transmission apparatus which operates stably at a high speed is required for practical use.

The transmission capacity of a trunk transmission system in a wide band information communication network of the type mentioned comes up to several giga bits/sec, and a wider band and a higher speed operation are required for an optical transmission-reception apparatus.

Such an optical transmission-reception apparatus as mentioned above has roughly three basic functions of (1) reshaping by equalizing amplification, (2) retiming and (3) regeneration (refer to "Electric Communication Technology News", Optical Fiber Communications).

FIG. 4 shows a general construction of an exemplary conventional optical transmission apparatus.

Referring to FIG. 4, the optical transmission apparatus shown includes an equalizing amplification circuit 2a for equalizing and amplifying an electric signal of a non-return-to-zero (NRZ) code obtained by photoelectric conversion by a light reception element 1, a dc regeneration circuit 3a, a timing extraction circuit 4a for extracting a timing signal (clock signal) of a component f0 synchronized with a data signal from an output signal (received data signal) of the equalizing amplification circuit 2a, an identification circuit 7 for waveform shaping a data signal from the dc regeneration circuit 3a using a timing signal from the timing extraction circuit 4a, a peak value detection circuit 5 for detecting a peak value of the output of the equalizing amplification circuit 2a by means of, for example, a diode detection circuit and outputting a dc voltage corresponding to the detected peak value, and a dc amplifier 6 for differentially amplifying the dc voltage outputted from the peak value detection circuit 5.

The equalizing amplification circuit 2a includes a front end amplifier 21, a variable gain amplifier 22 having a gain controlled by the dc amplifier 6, and a post amplifier 23. The timing extraction circuit 4a includes a differentiating circuit 41, a full-wave rectification circuit 42, a timing extraction filter a narrow-band amplifier 44 and a limiter amplifier 45.

In the conventional optical transmission apparatus of the construction described above, the equalizing amplification circuit 2a requires, as a required bandwidth, twice the transmission line speed where the transmission line code is a return-to-zero (RZ) code. Further, for a transmission system of the giga bit region, since the construction of the equalizing amplification circuit 2a is an ac coupling, a large dynamic range is required.

Further, in the conventional optical transmission apparatus, the dc regeneration circuit 3a is normally constructed such that a dc clamp circuit in which a diode and a capacitor are employed is incorporated in a main signal line.

In the dc regeneration circuit 3a of the conventional optical transmission apparatus, a dc clamp circuit must be interposed between an input buffer having a low output impedance and an output buffer having a high input impedance in order to minimize the error in dc clamping operation by a diode. However, if it is tried to apply such a circuit as described above to a very high speed pulse transmission apparatus which receives an input signal whose speed is higher than one giga bits/sec, the following problems are encountered.

First, it is difficult to realize a buffer circuit which has a sufficiently low output impedance or a sufficiently high input impedance in such a very high speed (very wide band) region, and without the buffer circuit, full clamping cannot be performed and full dc compensation cannot be achieved. Second, it is difficult to make the frequency to gain characteristic of the buffers flat over a very wide band, and where the characteristic is not flat, the input signal is distorted in waveform. Consequently, also the dc compensation characteristic is displaced from its ideal value. Third, although the input buffer and the output buffer normally include an emitter follower circuit formed from bipolar transistors or a source follower circuit formed from gallium arsenide field effect transistors, where such circuits are connected in cascade connection in a very high frequency region, they are very liable to oscillate. Consequently, a stable operation cannot be achieved readily.

SUMMARY OF THE INVENTION

It is an object of the present invention to provide an optical transmission method and an optical transmission apparatus wherein an equalization amplification circuit may have a narrow duty region and the optical transmission apparatus can be formed as an IC readily.

It is another object of the present invention to provide an optical transmission method and an optical transmission apparatus that are resistant against a variation in mark rate.

In order to attain the object described above, according to an aspect of the present invention, there is provided an optical transmission method for an optical transmission apparatus which includes an equalizing amplification section including a photoelectric conversion circuit for receiving a non-return-to-zero code as a reception signal, a timing extraction circuit, a dc regeneration circuit and an identification regeneration section, the optical transmission method comprising the steps of converting the reception signal of the non-return-to-zero code into a differentiation equalization code by the equalizing amplification section, dc regenerating the reception signal of the non-return-to-zero signal using the differentiation equalization code by the dc regeneration circuit, and extracting a timing signal using the differentiation equalization signal by the timing extraction section.

In the optical transmission method, a received signal of a non-return-to-zero code is converted into a differentiation equalization signal by the equalizing amplification circuit. Then, using the differentiation equalization signal, dc regeneration is performed by the dc regeneration circuit. Further, the timing extraction circuit extracts a timing signal using the differentiation equalization signal. Accordingly, the equalizing amplification circuit may have a narrow duty region. Consequently, the optical transmission method is resistant against a variation in mark rate.

According to another aspect of the present invention, there is provided an optical transmission apparatus, comprising an equalizing amplification circuit including a front end amplifier for amplifying a transmission signal obtained by photoelectric conversion, a differentiation circuit for producing a differentiation equalization signal from an output signal of the front end amplifier, and a variable gain amplifier and a post amplifier for amplifying an output signal of the differentiation circuit, a peak value detection circuit for detecting a peak value of the equalizing amplification circuit and outputting a dc voltage corresponding to the peak value, a dc amplifier for differentially amplifying the dc voltage from the peak value detection circuit to control a gain of the variable gain amplifier, a logic circuit for outputting a logically positive signal and a logically negative signal of the output signal of the equalizing amplification circuit, a dc regeneration circuit including a set-reset flip-flop circuit for receiving the logically positive signal of the logic circuit as a set signal and receiving the logically negative signal of the logic circuit as a reset signal, a timing extraction circuit including a full-wave rectification circuit for full-wave rectifying the output signal of the equalizing amplification circuit, a timing extraction filter for extracting a timing signal from an output of the full-wave rectification circuit, and a narrow-band amplifier and a limiter amplifier for amplifying the timing signal, and an identification circuit for waveform shaping an output signal of the dc regeneration circuit using the timing signal from the timing extraction circuit.

In the optical amplification apparatus, since the equalizing amplification circuit includes a differentiation circuit for producing a differentiation equalization signal from a received signal of a non-return-to-zero (NRZ) code while the dc regeneration circuit includes a logic circuit for outputting a logically positive signal and a logically negative signal of the output signal of the equalizing amplification circuit and a set-reset flip-flop circuit for receiving a logically positive signal of the output of the logic circuit as a set signal and receiving a logically negative signal of the output of the logic circuit as a reset signal and the timing extraction circuit includes a full-wave rectification circuit provided at an input terminal of the timing extraction circuit, the equalizing amplification circuit may have a narrow duty region while the dc regeneration circuit has a high degree of realization. Consequently, the optical transmission apparatus can be formed as an IC which is resistant against a variation in mark rate.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a block diagram showing an exemplary conventional optical transmission apparatus.

DESCRIPTION OF THE PREFERRED EMBODIMENT

Figure 1:
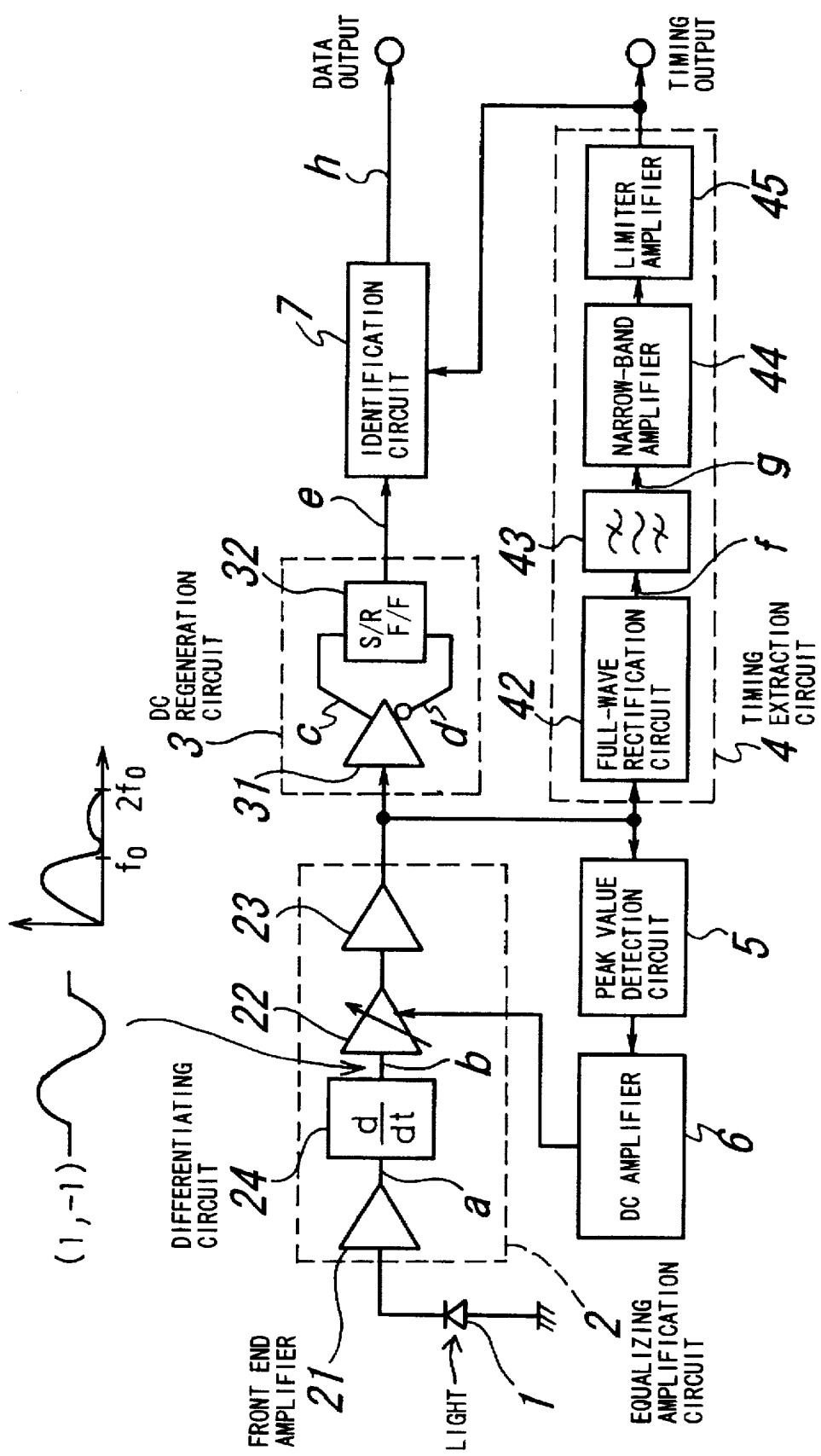
FIG. 1 is a block diagram of an optical transmission apparatus to which the present invention is applied.

Referring first to FIG. 1, there is shown an optical transmission apparatus to which the present invention is applied. The optical transmission apparatus is an improvement to the conventional optical transmission apparatus described hereinabove with reference to FIG. 4. Thus, the optical transmission apparatus of the present embodiment has several common components to those of the conventional optical transmission apparatus of FIG. 4, and overlapping description of the common components is omitted herein to avoid redundancy. The optical transmission apparatus is different in construction of the equalizing amplification circuit denoted at 2, the dc regeneration circuit denoted at 3 and the timing extraction circuit denoted at 4 from the conventional optical transmission apparatus of FIG. 4. In particular, in the optical transmission apparatus of the present embodiment, the equalizing amplification circuit 2 additionally includes a differentiating circuit 24 interposed between the front end amplifier 21 and the variable gain amplifier 22; the dc regeneration circuit 3 includes a logic circuit 31 for outputting logically positive and negative output signals of the output signal of the equalizing amplification circuit 2, and a set-reset flip-flop circuit 32 which receives the logically positive signal of the output of the logic circuit 31 as a set signal and receives the logically negative signal of the output of the logic circuit 31 as a reset signal; and the timing extraction circuit 4 eliminates the differentiating circuit 41.

Figure 2:
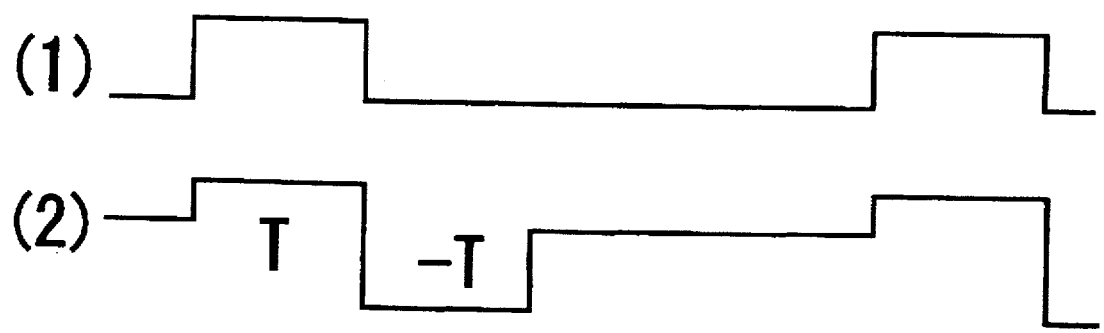
FIG. 2 is a waveform diagram illustrating a transmission characteristic of a differentiating circuit shown in FIG. 1.
Figure 3:
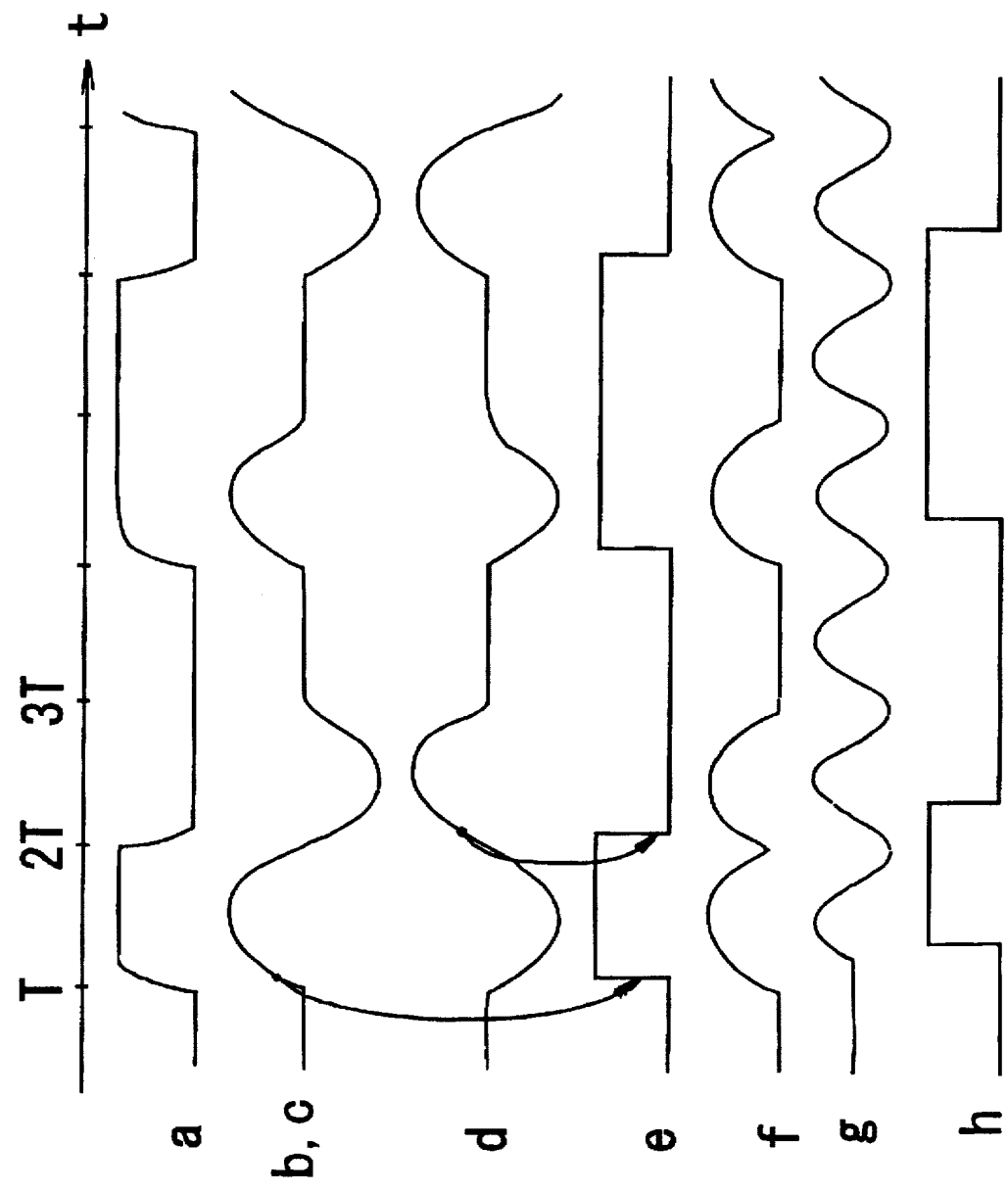
FIG. 3 is a time chart illustrating operation of the optical transmission apparatus of FIG. 1.

Subsequently, operation of the optical transmission apparatus will be described with reference to FIG. 2. It is to be noted that, for the convenience of description, an NRZ signal of the pulse duty factor of 100% is assumed as a transmission line code.

A transmission signal a received by the light reception element 1 is photo-electrically converted by the light reception element 1 and amplified by the front end amplifier 21, whereafter it is inputted to the differentiating circuit 24.

The differentiating circuit 24 thus produces a differentiation equalization signal b. The differentiating circuit 24 has a transmission characteristic of (T, −T) with respect to a period T of an input pulse signal thereto as seen in FIG. 2. Accordingly, as an operation of the differentiating circuit 24, it detects variation points of rising and falling edges of the input signal a. At the first variation point (rising edge), the differentiation equalization signal b exhibits a pulse width of approximately T of a positive (+) amplitude, but at the next variation point (falling edge), the differentiation equalization signal b exhibits a pulse width of approximately T of a negative (−) amplitude. If a same code appears successively, then the differentiation equalization signal b exhibits a zero level as a signal level. In other words, the output signal b of the differentiating circuit 24 has a dc balanced waveform irrespective of the mark rate. The output signal of the differentiating circuit 24 is amplified to a desired level by the variable gain amplifier 22 and the post amplifier 23 and then inputted to the dc regeneration circuit 3 and the timing extraction circuit 4. Since the Nyquist frequency of a differentiation equalization signal is equal to one half the frequency synchronized with the transmission line speed, also the bands of the variable gain amplifier 22 and the post amplifier 23 need not have a wide band, and from the point of view of the noise characteristic, a narrow band characteristic is desired rather. For example, if the transmission line speed is 10 giga bits, then the band should be 3 to 10 giga Hertz. Accordingly, the variable gain amplifier 22 and the post amplifier 23 may be formed from an MMIC (microwave monolithic integrated circuit).

The logic circuit 31 of the dc regeneration circuit 3 outputs a non-inverted signal c and an inverted signal d of the output signal b of the equalizing amplification circuit 2. The set-reset flip-flop circuit 32 thus receives the non-inverted signal c as a set pulse and receives the inverted signal d as a reset pulse to produce an output signal e whose dc level is fixed irrespective of the mark rate. The output signal e of the logic circuit 31 is outputted to the identification circuit 7. Meanwhile, the output signal e of the equalizing amplification circuit 2 inputted to the timing extraction circuit 4 is rectified by the full-wave rectification circuit 42 so that it is converted into a signal of a signal waveform f. The signal waveform f is processed by the same processing as that of the timing extraction circuit 4a of the conventional optical transmission apparatus so that a timing signal g is produced. The identification circuit 7 waveform shapes the output signal e using the timing signal g to produce a signal h and outputs the signal h.

With the optical transmission apparatus of the construction described above, since the band of the equalizing amplification circuit may be a narrow band and a dc regeneration circuit which can be realized with a high degree of possibility can be constructed, the optical transmission apparatus can be formed as an IC even in a region higher than 10 giga bits.

Having now fully described the invention, it will be apparent to one of ordinary skill in the art that many changes and modifications can be made thereto without departing from the spirit and scope of the invention as set forth herein.

What is claimed is:

1. An optical transmission method for an optical transmission apparatus which includes an equalizing amplification section including a photoelectric conversion circuit for receiving a non-return-to-zero code as a reception signal, a timing extraction circuit, a dc regeneration circuit and an identification regeneration section, the optical transmission method comprising the steps of:

converting the reception signal of the non-return-to-zero code into a differentiation equalization code by said equalizing amplification section;

dc regenerating the reception signal of the non-return-to-zero signal using the differentiation equalization code by said dc regeneration circuit; and extracting a timing signal using the differentiation equalization signal by said timing extraction section.

2. An optical transmission apparatus, comprising:

an equalizing amplification circuit including a front end amplifier for amplifying a transmission signal obtained by photoelectric conversion, a differentiation circuit for producing a differentiation equalization signal from an output signal of said front end amplifier, and a variable gain amplifier and a post amplifier for amplifying an output signal of said differentiation circuit;

a peak value detection circuit for detecting a peak value of said equalizing amplification circuit and outputting a dc voltage corresponding to the peak value;

a dc amplifier for differentially amplifying the de voltage from said peak value detection circuit to control a gain of said variable gain amplifier;

a dc regeneration circuit including a logic circuit for outputting a logically positive signal and a logically negative signal of the output signal of said equalizing amplification circuit and a set-reset tip-flop circuit for receiving the logically positive signal of said logic circuit as a set signal and receiving the logically negative signal of said logic circuit as a reset signal;

a timing extraction circuit including a full-wave rectification circuit for full-wave rectifying the output signal of said equalizing amplification circuit, a timing extraction filter for extracting a timing signal from an output of said full-wave rectification circuit, and a narrow-band amplifier and a limiter amplifier for amplifying the timing signal; and an identification circuit for waveform shaping an output signal of said dc regeneration circuit using the timing signal from said timing extraction circuit.

* * * * *